(12) United States Patent
Oooka et al.

(10) Patent No.: US 9,722,902 B2
(45) Date of Patent: Aug. 1, 2017

(54) EVACUATION TRAVELLING ASSISTANCE APPARATUS

(71) Applicant: DENSO CORPORATION, Kariya, Aichi-pref. (JP)

(72) Inventors: Masao Oooka, Gamagori (JP); Takeshi Miura, Kariya (JP); Hiroaki Niino, Toyota (JP); Hiroshi Mizuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 10 days.

(21) Appl. No.: 14/721,109

(22) Filed: May 26, 2015

(65) Prior Publication Data

US 2015/0345961 A1 Dec. 3, 2015

(30) Foreign Application Priority Data

May 30, 2014 (JP) ................................ 2014-112900

(51) Int. Cl.
| | |
|---|---|
| *G01C 21/34* | (2006.01) |
| *H04L 12/26* | (2006.01) |
| *H04W 24/02* | (2009.01) |
| *H04W 24/08* | (2009.01) |
| *H04W 28/02* | (2009.01) |

(52) U.S. Cl.
CPC ......... *H04L 43/0888* (2013.01); *H04W 24/02* (2013.01); *H04W 24/08* (2013.01); *H04W 28/0278* (2013.01)

(58) Field of Classification Search
CPC .............................. B60W 30/12; G01C 21/34
See application file for complete search history.

(56) References Cited

U.S. PATENT DOCUMENTS

| | | | | |
|---|---|---|---|---|
| 8,600,657 B2* | 12/2013 | Saito | ......................... | B60T 7/22 |
| | | | | 701/301 |
| 8,942,880 B2* | 1/2015 | Nordbruch | ............ | B60W 40/08 |
| | | | | 340/436 |

(Continued)

FOREIGN PATENT DOCUMENTS

JP 2009-151522 7/2009

*Primary Examiner* — Angela Ortiz
*Assistant Examiner* — Michael Berns
(74) *Attorney, Agent, or Firm* — Harness, Dickey & Pierce, P.L.C.

(57) ABSTRACT

In an evacuation travelling assistance apparatus, a risk determining unit determines, when a driver is not in a state capable of appropriately performing driving operations, a risk involved in stopping at a location and a risk involved in passing through the location, for each of a plurality of locations that may serve as an advancing destination of the own vehicle, based on map information, own vehicle information, and peripheral environment information. An evacuation destination setting unit sets a location at which the risk involved in stopping at the location is lower than a predetermined reference as an evacuation destination, based on the determined risk. An evacuation route setting unit combines locations at which the risk involved in passing through the location is lower than a predetermined reference, based on the determined risk, and sets an evacuation route from the current position of the own vehicle to the evacuation destination.

7 Claims, 12 Drawing Sheets

(56) References Cited

U.S. PATENT DOCUMENTS

| | | | |
|---|---|---|---|
| 9,014,960 B2* | 4/2015 | Bresnahan | G01C 21/3407 |
| | | | 701/426 |
| 9,108,592 B2* | 8/2015 | Nordbruch | A61B 5/18 |
| 9,227,631 B2* | 1/2016 | Kammel | B60K 28/066 |
| 2015/0345964 A1* | 12/2015 | Oooka | G01C 21/3415 |
| | | | 701/41 |

* cited by examiner

FIG.6A
STOP POSITION
RISK MAP
FIG.6B
ENTRY
RISK MAP
FIG.6C
COURSE-CHANGE ROUTE
RISK MAP
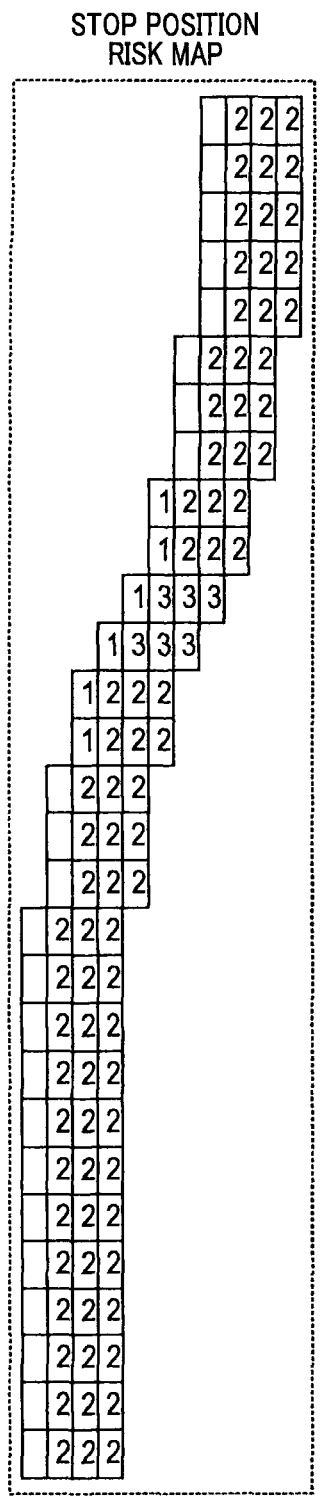
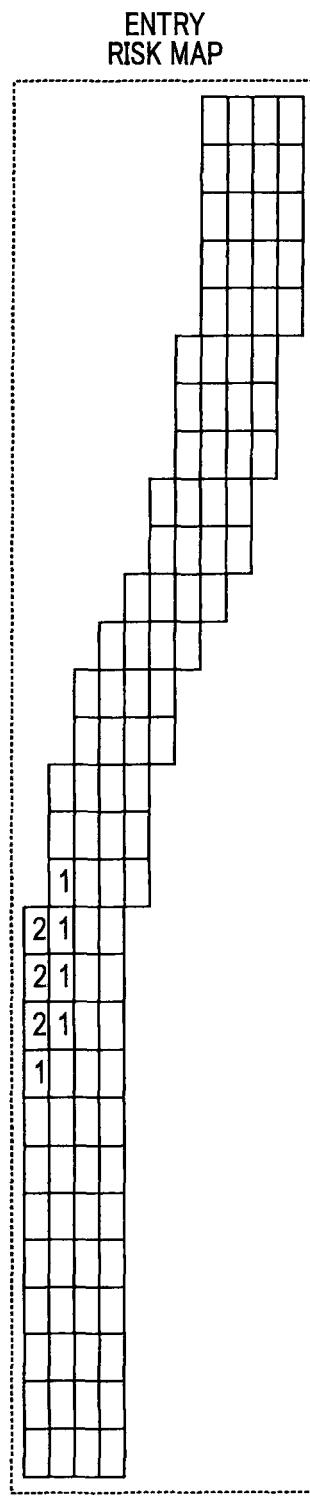
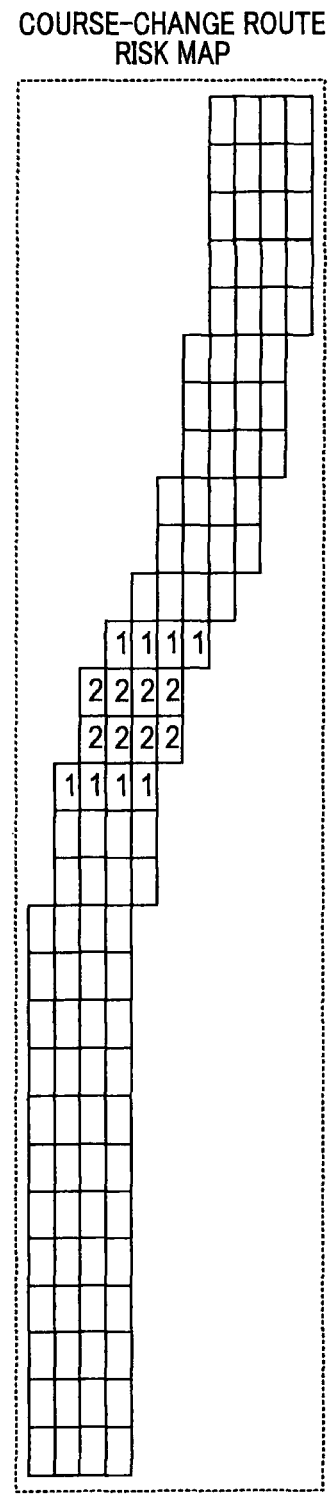

FIG.7A
CONTROL-LIMIT MOVEMENT RISK MAP
FIG.7B
DECELERATION STOP MOVEMENT RISK MAP
FIG.7C
COURSE-CHANGE (LEFT) MOVEMENT RISK MAP
FIG.7D
MOVEMENT STOP RISK MAP
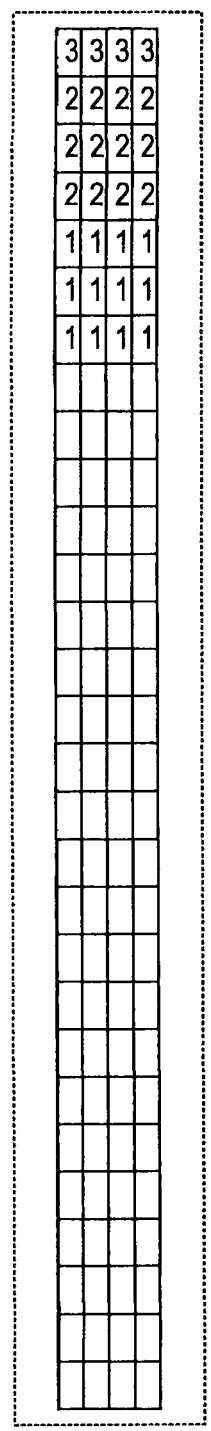
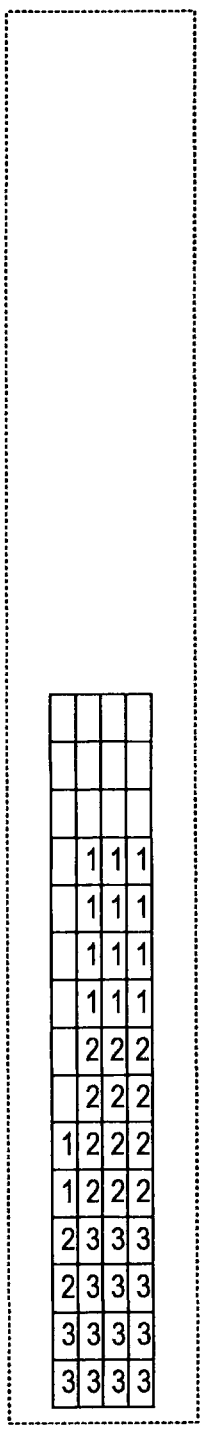
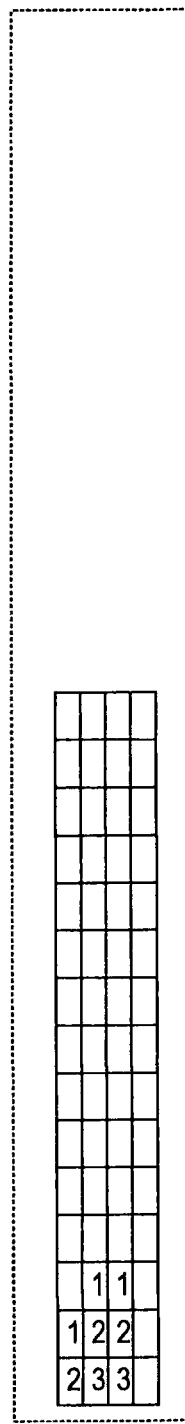
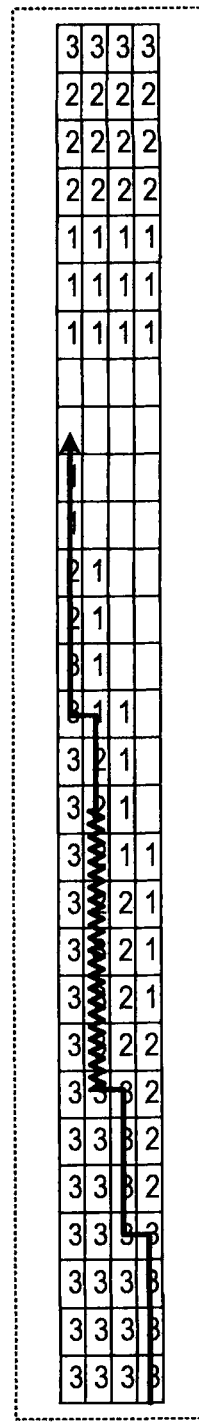

CONTROL-LIMIT
MOVEMENT RISK MAP

DECELERATION STOP
MOVEMENT RISK MAP

COURSE-CHANGE (LEFT)
MOVEMENT RISK MAP

MOVEMENT STOP
RISK MAP

STOP POSITION RISK MAP | ENTRY RISK MAP | MOVEMENT STOP RISK MAP | EVACUATION DESTINATION

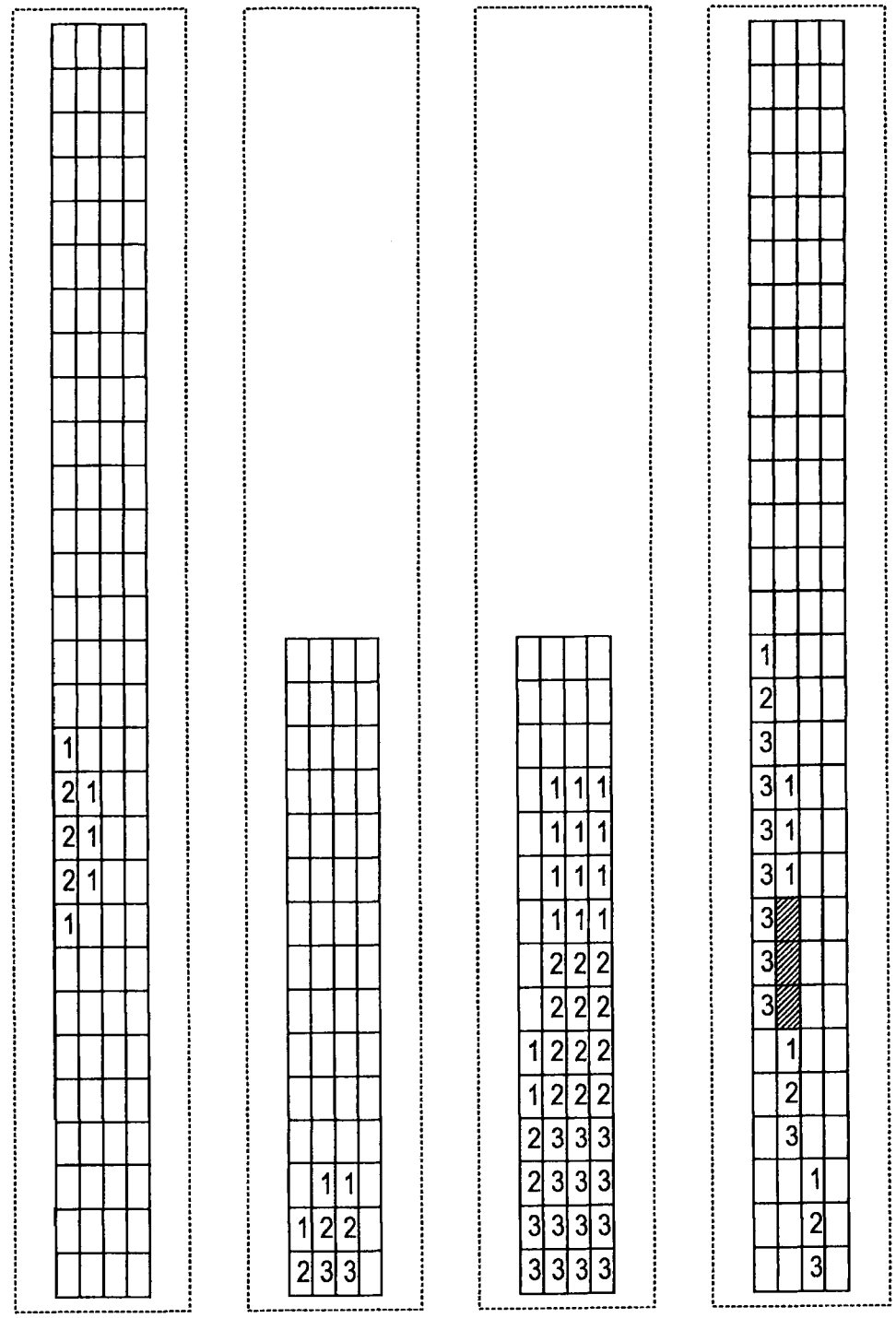

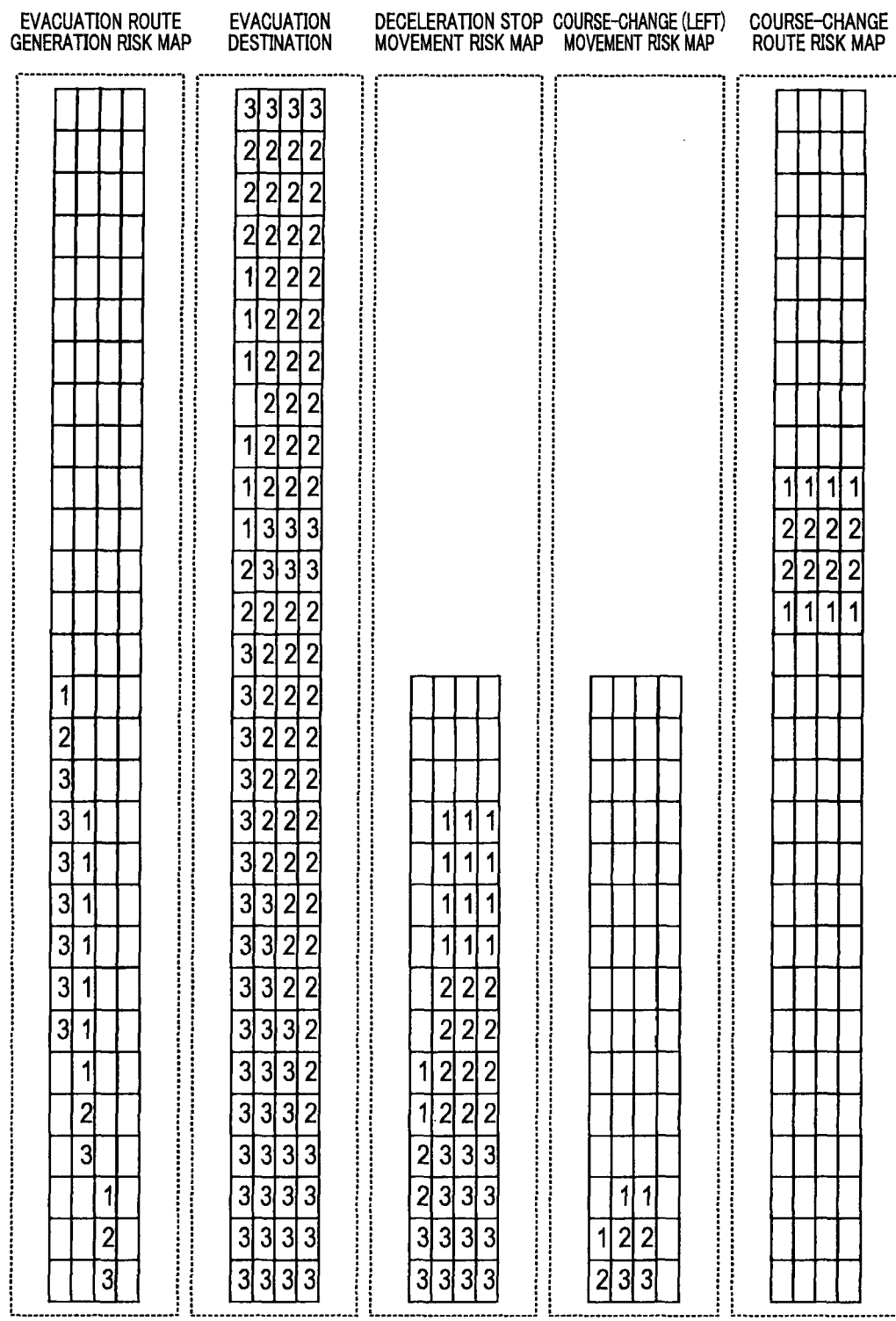

EVACUATION TRAVELLING ASSISTANCE APPARATUS

CROSS-REFERENCE TO RELATED APPLICATION

This application is based on and claims the benefit of priority from Japanese Patent Application No. 2014-112900, filed May 30, 2014, the disclosure of which is incorporated herein in its entirety by reference.

BACKGROUND

Technical Field

The present invention relates to an evacuation travelling assistance apparatus.

Related Art

Emergency evacuation systems have been proposed that detect reduction in the level of consciousness of the driver and evacuate the own vehicle to an evacuation destination (refer to, for example, JP-A-2009-151522).

In the case of the technology described in above-mentioned JP-A-2009-151522, a travelling vehicle is evacuated to the road shoulder. However, the technology described in JP-A-2009-151522 does not evaluate or determine in any way whether or not the road shoulder that serves as the evacuation destination is actually a safe location.

Therefore, for example, the vehicle may be evacuated to the road shoulder, regardless of whether the road shoulder is along a straight route that offers good visibility (in other words, an evacuation destination that has a high level of safety) or at the end of a curve that offers poor visibility (in other words, an evacuation destination that has a low level of safety). As a result, when an evacuation destination that has a low level of safety like the latter is selected, compared to when an evacuation destination that has a high level of safety like the former is selected, disadvantages arise such as an increased probability of a minor collision with a following vehicle occurring.

In some cases, when only an evacuation destination that has a low level of safety is present, stopping the vehicle in an evacuation destination that has a low level of safety becomes unavoidable. However, in cases in which the vehicle can reach an evacuation destination having a high level of safety simply by travelling slightly farther from the location of the evacuation destination having a low level of safety, evacuation of the vehicle to the evacuation destination having a high level of safety may possibly be more advantageous.

Conversely, in cases in which the travelling distance to a location in which the vehicle can be stopped becomes excessively long as a result of the vehicle being evacuated to an evacuation destination that has a high level of safety, factors leading to accidents may increase by a similar extent. Therefore, in the above-described technology described in JP-A-2009-151522 in which the evacuation destination is determined without comprehensively determining these various conditions, a problem occurs in that evacuation of the vehicle to an evacuation destination that has a higher level of safety may not necessarily be actualized.

SUMMARY

It is thus desired to provide an evacuation travelling assistance apparatus that is capable of appropriately evacuating a vehicle to an evacuation destination that has a higher level of safety.

An exemplary embodiment provides an evacuation travelling assistance apparatus that includes a map information acquiring unit, an own vehicle information acquiring unit, a peripheral environment information acquiring unit, a driver information acquiring unit, a driver state determining unit, a risk determining unit, an evacuation destination setting unit, an evacuation route setting unit, and an evacuation travelling control unit.

The map information acquiring unit acquires map information (such as the road shape, the gradient, and the road surface condition) related to an area that may serve as an advancing destination of the own vehicle.

The own vehicle information acquiring unit acquires own vehicle information (such as the speed of the own vehicle) related to the state of the own vehicle.

The peripheral environment information acquiring unit acquires peripheral environment information (such as the position and speed of another vehicle, the position of a pedestrian, and the position of a structure such as guardrails) related to targets present in the periphery of the own vehicle.

The driver information acquiring unit acquires information that enables determination of whether or not the driver is in a state capable of appropriately performing driving operations.

The driver state determining unit determines whether or not the driver is in a state capable of appropriately performing driving operations, based on the information acquired by the driver information acquiring unit.

The risk determining unit determines the risk involved in stopping at a location and the risk involved in passing through the location, based on the map information, the own vehicle information, and the peripheral environment information, when determined by the driver state determining unit that the driver is not in a state capable of appropriately performing driving operations, for each of a plurality of locations that may serve as an advancing destination of the own vehicle, included in the map information acquired by the map information acquiring unit.

The evacuation destination setting unit sets a location at which the risk involved in stopping at the location is lower than a predetermined reference as an evacuation destination, based on the risk determined by the risk determining unit.

The evacuation route setting unit combines locations at which the risk involved in passing through the location is lower than a predetermined reference, based on the risk determined by the risk determining unit, and sets an evacuation route from the current position of the own vehicle to the evacuation destination.

The evacuation travelling control unit generates data that is to be provided to a travelling assistance system included in the own vehicle, based on the set evacuation destination and evacuation route, and provides the generated data to the travelling assistance system, thereby making the own vehicle advance to the evacuation destination along the evacuation route.

In the evacuation travelling assistance apparatus configured as described above, the risk determining unit performs risk determination such as that described above, and the evacuation destination and the evacuation route are set. Therefore, compared to techniques in which the evacuation destination is determined without risk determination such as that described above being performed, the evacuation travelling assistance apparatus can evacuate the vehicle to an evacuation destination that has a higher level of safety.

In addition, regarding the evacuation route used to move the vehicle to such an evacuation destination, compared to techniques in which vehicle speed and advancing direction are controlled without risk determination such as that described above being performed, the evacuation travelling assistance apparatus can use an evacuation route that has a higher level of safety.

BRIEF DESCRIPTION OF THE DRAWINGS

In the accompanying drawings:

FIG. 6A is an explanatory diagram of an example of a stop position risk map;

FIG. 6B is an explanatory diagram of an example of an entry risk map;

FIG. 6C is an explanatory diagram of an example of a course-change route risk map;

FIG. 7A is an explanatory diagram of an example of a control-limit movement risk map;

FIG. 7B is an explanatory diagram of an example of a deceleration stop movement risk map;

FIG. 7C is an explanatory diagram of an example of a course-change (left) movement risk map;

FIG. 7D is an explanatory diagram of an example of a movement stop risk map obtained by combining the maps in FIG. 7A to FIG. 7C;

FIG. 10A is an explanatory diagram of an example of the entry risk map;

FIG. 10B is an explanatory diagram of an example of the course-change (left) movement risk map;

FIG. 10C is an explanatory diagram of an example of the deceleration stop movement risk map;

FIG. 10D is an explanatory diagram of an example of an evacuation route generation risk map obtained by combining the maps in FIG. 10A to FIG. 10C;

FIG. 11A is an explanatory diagram of a list of risk maps used for route setting and is an example of the evacuation route generation risk map:

FIG. 11B is an explanatory diagram of a list of risk maps used for route setting and is an example of the evacuation destination setting risk map;

FIG. 11C is an explanatory diagram of a list of risk maps used for route setting and is an example of the deceleration stop movement risk map;

FIG. 11D is an explanatory diagram of a list of risk maps used for route setting and is an example of the course-change (left) movement risk map;

FIG. 11E is an explanatory diagram of a list of risk maps used for route setting and is an example of the course-change route risk map;

DESCRIPTION OF EMBODIMENTS

Next, the above-described evacuation travelling assistance apparatus according to an exemplary embodiment will be described.

Configuration

Figure 1:
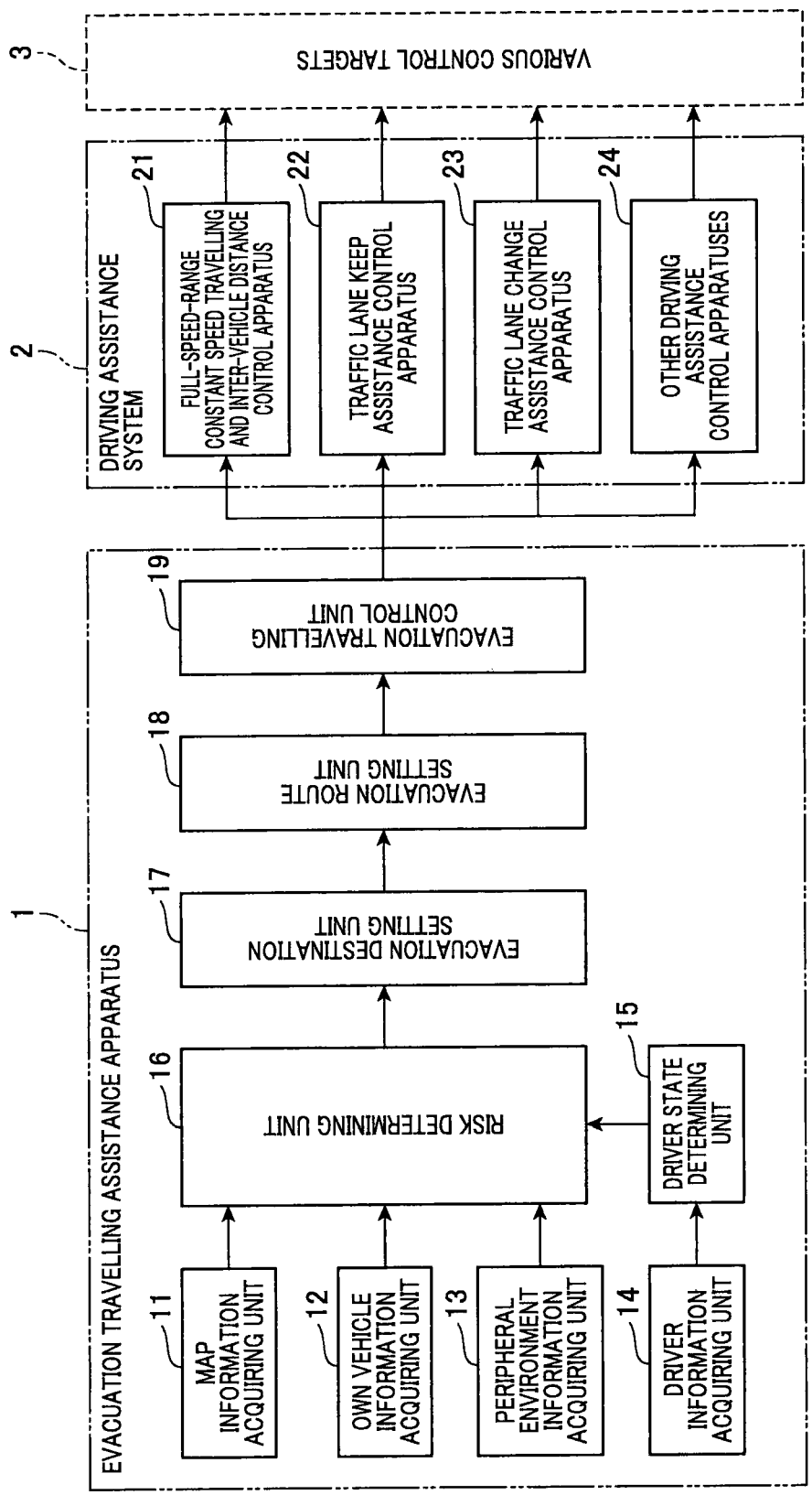
FIG. 1 is a block diagram of the configurations of an evacuation travelling assistance apparatus according to an embodiment and an apparatus that operates in cooperation with the evacuation travelling assistance apparatus.

An evacuation travelling assistance apparatus (also called an emergency driver assist system) 1, shown in FIG. 1, operates in cooperation with a travelling assistance system 2 that is provided in an own vehicle, when a driver is assumed to be in a state incapable of appropriately performing driving operations, and assists the own vehicle in travelling to and stopping at a safer evacuation area.

Although details will be described hereafter, for each of a plurality of locations that may serve as an advancing destination of the own vehicle, the evacuation travelling assistance apparatus 1 evaluates the risk involved in passing through a location and the risk involved in stopping at a location, based on various criteria. Based on the evaluation results, the evacuation travelling assistance apparatus 1 attempts to stop the own vehicle at an evacuation location that is, ideally, assumed to involve the lowest risk possible, over an evacuation route that is, ideally, assumed to involve the lowest risk possible.

A more detailed description will be given hereafter. According to the present embodiment, the evacuation travelling assistance apparatus 1 includes a map information acquiring unit 11, an own vehicle information acquiring unit 12, a peripheral environment information acquiring unit 13, a driver information acquiring unit 14, a driver state determining unit 15, a risk determining unit 16, an evacuation destination setting unit 17, an evacuation route setting unit 18, an evacuation travelling control unit 19, and the like.

The map information acquiring unit 11 is configured to be capable of acquiring map information related to an area that may serve as an advancing destination of the own vehicle. Examples of the map information acquired by the map information acquiring unit 11 include road line-shape information (such as the curvature and gradient, as well as the points of change thereof), traffic lane information (such as the number of traffic lanes, the type of traffic lane (driving lane, passing lane, climbing lane, emergency stopping lane, road shoulder, right- or left-turn lane, merging lane, and slip lane), and the length and width of each traffic lane), connection point information (such as intersections, junctions, mergers, crosswalks, and railroad crossings), and road boundary information (such as guardrails, walls, side ditches, poles, blocks, fences, and cliffs).

Such map information may be collected in advance in a storage unit within the own vehicle, and the map information acquiring unit 11 may be configured to acquire the map information from the storage unit. Alternatively, the map information acquiring unit 11 may be configured to acquire required information by communicating with equipment outside of the own vehicle. Both techniques may also be used in combination.

The own vehicle information acquiring unit 12 is configured to be capable of acquiring own vehicle information that is information related to the state of the own vehicle. More specifically, for example, the own vehicle information acquiring unit 12 includes a turn signal sensor, a speed sensor, an acceleration sensor, a steering sensor, and the like. The own vehicle information acquiring unit 12 detects the operating state of the turn signal, the speed of the own vehicle, the acceleration (deceleration) of the own vehicle, the steering operation amount, and the like, and acquires information related to the travelling state of the own vehicle and the like.

The peripheral environment information acquiring unit 13 is configured to be capable of acquiring peripheral environment information that is information related to targets present in the periphery of the own vehicle. More specifically, for example, the peripheral environment information acquiring unit 13 includes an image sensor, a radar sensor, a global positioning system (GPS) sensor, a locator, and the like.

The peripheral environment information acquiring unit 13 captures images of the periphery of the own vehicle and detects various targets from the images, detects the distance to a target present in the periphery of the own vehicle and the relative speed thereof using millimeter waves or sound waves, and detects the current position of the own vehicle. In addition, for example, the peripheral environment information acquiring unit 13 performs image processing to extract detected targets, performs processing to identify the number of traffic lanes and the traffic lane in which the own vehicle is travelling, and the like, based on the imaging results from the image sensor.

The driver information acquiring unit 14 is configured to be capable of acquiring information that enables determination of whether or not the driver is in a state capable of appropriately performing driving operations. More specifically, for example, the driver information acquiring unit 14 includes a camera that captures images of the driver. The driver information acquiring unit 14 extracts feature quantities of the face and eyes of the driver, and makes a determination regarding the state of the driver.

Alternatively, the driver information acquiring unit 14 monitors the operation state of the driver using a steering angle sensor or the like, or monitors the blood pressure, body temperature, and the like of the driver. The driver information acquiring unit 14 provides the driver information acquired by the various devices to the driver state determining unit 15, and the driver information is then used to determine whether or not the driver is in a state capable of appropriately performing driving operations.

The driver state determining unit 15, the risk determining unit 16, the evacuation destination setting unit 17, the evacuation route setting unit 18, and the evacuation travelling control unit 19 are configured by hardware, such as a known microcomputer that includes a central processing unit (CPU), a memory, and the like, and software that runs on the hardware.

The driver state determining unit 15 determines whether or not the driver is in a state capable of appropriately performing driving operations, based on the information acquired by the driver information acquiring unit 14. When determined by the driver state determining unit 15 that the driver is not in a state capable of appropriately performing driving operations, for each of the plurality of locations that may serve as an advancing destination of the own vehicle, included in the map information acquired by the map information acquiring unit 11, the risk determining unit 16 determines the risk involved in stopping at a location and the risk involved in passing through the location, based on the map information, the own vehicle information, and the peripheral environment information. A specific example of the determination method will be described in detail hereafter.

The evacuation destination setting unit 17 sets a location at which the risk involved in stopping at the location is lower than a predetermined reference as an evacuation destination, based on the risk involved at each location determined by the risk determining unit 16. The predetermined reference may be an absolute reference or a relative reference. For example, as a setting method that is based on an absolute reference, a method can be considered in which each location is given a score based on the risk level at the location, and a location is set as a candidate for the evacuation destination when the score is lower than a predetermined absolute value (reference). In addition, as a setting method that is based on a relative reference, a method can be considered in which each location is given a score based on the risk level at the location, and a location that has the lowest score or locations that have scores lower than an average score are set as candidates for the evacuation destination.

The evacuation route setting unit 18 combines locations at which the risk involved in passing through the location is lower than a predetermined reference, based on the risk determined by the risk determining unit 16, and sets an evacuation route from the current position of the own vehicle to the evacuation destination. In terms of selecting locations involving lower risk by taking into consideration the risk involved at each location, the evacuation route setting unit 18 performs a process similar to that performed by the above-described evacuation destination setting unit 17.

However, the evacuation destination setting unit 17 selects the final stopping position. Therefore, the evacuation destination setting unit 17 sets the evacuation destination taking into consideration or focusing on the risk involved in stopping at the evacuation destination (such as the likelihood of a rear-end collision with a following vehicle and the likelihood of a side collision, when the own vehicle stops at the evacuation destination), and not taking into consideration or focusing on the risks accompanying movement by the own vehicle.

Meanwhile, the evacuation route setting unit 18 selects the evacuation route on which the own vehicle cruises to reach the evacuation destination. Therefore, the evacuation route setting unit 18 sets the evacuation route while taking into consideration or focusing on the risks attributed to travelling, acceleration, and deceleration by the own vehicle, the changing of traffic lanes, the presence/absence of a following vehicle, and the like.

When the evacuation destination and the evacuation route are set by the evacuation destination setting unit 17 and the evacuation route setting unit 18, the evacuation travelling control unit 19 generates data that is to be provided to the travelling assistance system 2 included in the own vehicle, based on the set evacuation destination and evacuation route, and provides the generated data to the travelling assistance system 2.

The travelling assistance system 2 includes, for example, a full-speed-range constant speed travelling and inter-vehicle distance control apparatus (full-speed-range adaptive cruise control (ACC)) 21, a traffic lane keeping assistance control apparatus (lane keep assist) 22, a traffic lane change assistance control apparatus (lane change assist) 23, and other travelling assistance control apparatuses 24. The other travelling assistance control apparatuses 24 can include an antilock braking system, a collision-damage mitigation braking system, a stability control system, and the like.

The systems configuring the travelling assistance system 2 include systems that operate when predetermined driver operations are performed. Therefore, when a required system is not operating, the evacuation travelling assistance apparatus 1 issues a command to start operation of the system, independently of the driver operation. In many cases, the systems configuring the travelling assistance system 2 are respectively managed by electronic control units (ECU) that control the systems (such as an ACC-ECU, an LKA-ECU, and a LCA-ECU). Therefore, when the evacuation destination and the evacuation route such as those described above are set, the evacuation travelling control apparatus 1 transmits, to each ECU, information indicating that the own vehicle will be advanced on the evacuation route or to the evacuation destination.

When a command issued by the evacuation travelling control apparatus 1 is received, each system configuring the travelling assistance system 2 performs calculation of data required for specific deceleration control, lane keep control, lane change control, collision avoidance control, and the like, taking into consideration the speed of the own vehicle, the road line shape, the presence/absence of a following vehicle, and the like.

The travelling assistance system 2 controls various control targets 3 based on the calculation results, and the various control targets 3 perform accelerator control, brake control, steering control, and the like, thereby actualizing desired vehicle movement control. The systems configuring the travelling assistance system 2 are themselves publicly known technologies. Therefore, further detailed descriptions thereof are omitted.

Processes

Next, processes performed by the evacuation travelling assistance apparatus and the related system thereof will be described with reference to FIGS. 2 to 5. The processes described below are started together with the startup of the vehicle and repeatedly performed thereafter.

Figure 2:
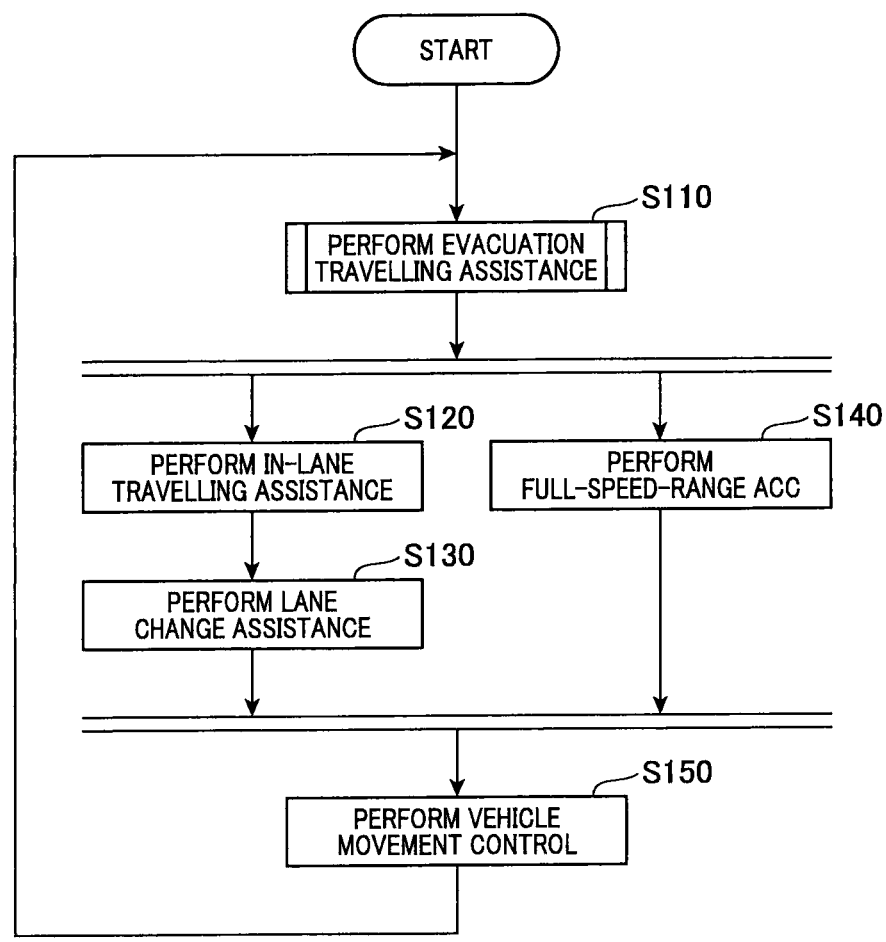
FIG. 2 is a flowchart of a main process performed by the evacuation travelling assistance apparatus.

When the process shown in FIG. 2 is started, the evacuation travelling assistance apparatus 1 performs an evacuation travelling assistance process (step S110). Although details will be described hereafter, at step S110, the evacuation travelling assistance apparatus 1 determines whether or not evacuation travelling assistance is required. When determined that evacuation travelling assistance is required, the evacuation travelling assistance apparatus 1 performs evacuation travelling assistance. When determined that evacuation travelling assistance is not required, the evacuation travelling assistance apparatus 1 does not perform evacuation travelling assistance.

Next, the traffic lane keep assistance control apparatus 22 performs in-lane travelling assistance (lane keep assist) (step S120), and the traffic lane change assistance control apparatus 23 performs lane change assistance (lane change assist) (step S130). Lane change assistance is performed when in-lane travelling assistance is being performed. Meanwhile, in parallel with in-lane travelling assistance and lane change assistance, the full-speed-range cruise control and inter-vehicle distance control apparatus 21 performs full-speed-range ACC (step S140). At steps S120 to S140, the details of assistance performed by the systems differ depending on whether or not evacuation travelling assistance is performed at step S110.

When the processes at steps S120 to S140, such as those described above, are performed, the control targets controlled by the systems perform accelerator control, brake control, steering control, and the like. As a result, the desired vehicle movement control is performed (step S150). When the process at step S150 is completed, the process returns to step S110 and the processes at steps S110 to S150 are repeatedly performed thereafter.

Figure 3:
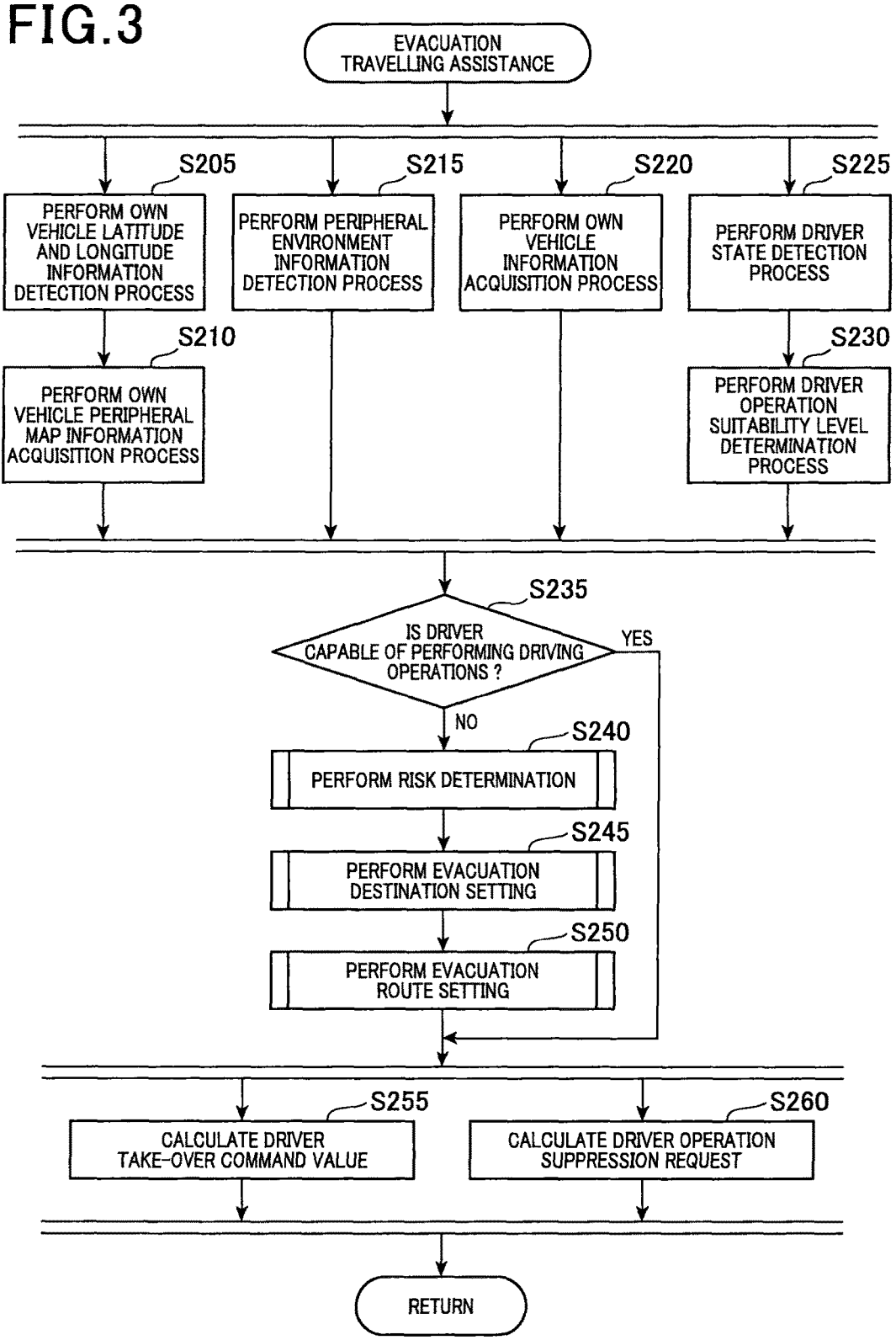
FIG. 3 is a flowchart of an evacuation travelling assistance process.
Figure 4:
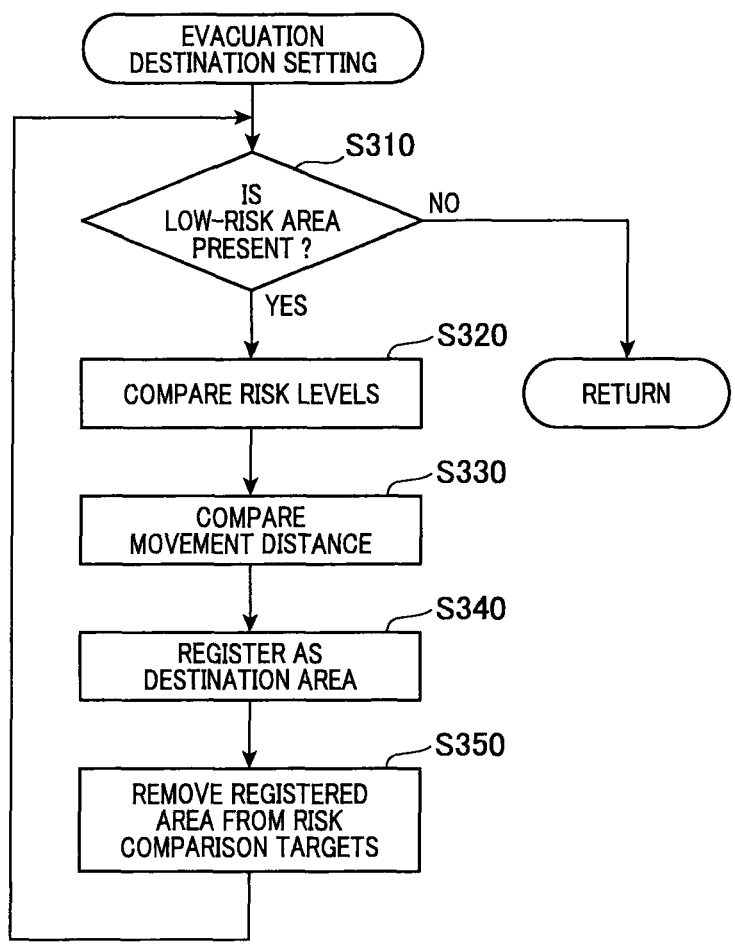
FIG. 4 is a flowchart of an evacuation destination setting process.
Figure 5:
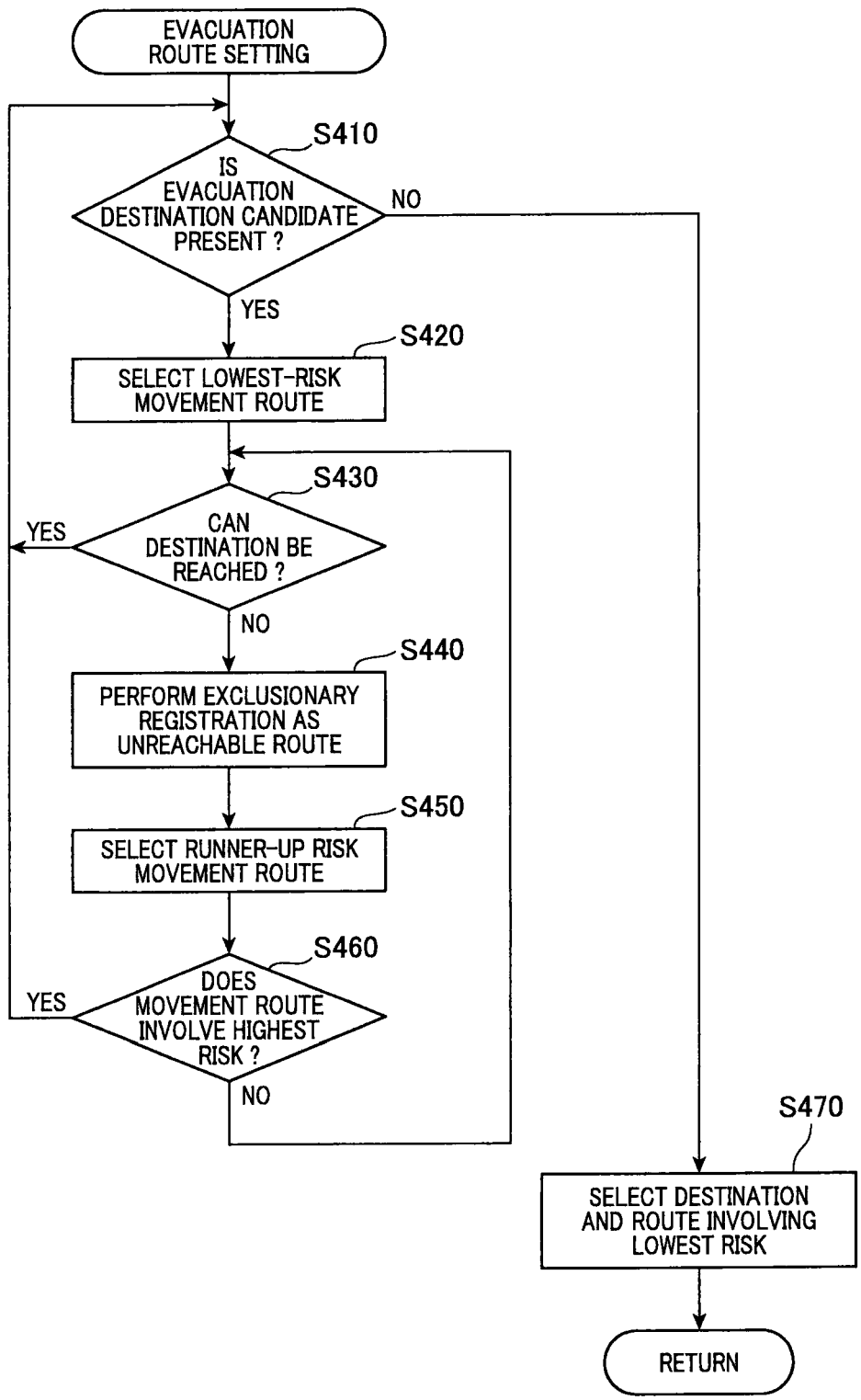
FIG. 5 is a flowchart of an evacuation route setting process.

When the process shown in FIG. 3 is started, in the evacuation travelling assistance apparatus 1, the map information acquiring unit 11 performs a process for detecting latitude and longitude information of the own vehicle using the GPS sensor and the like (step S205), and performs a process for acquiring map information of the periphery of the own vehicle (step S210). In addition, the peripheral environment information acquiring unit 13 performs a peripheral environment information detection process (step S215). As a result of the process at step S215, the distance to a target present in the periphery of the own vehicle and the relative speed thereof are detected, and the traffic lane in which the own vehicle is travelling and the like are identified.

In addition, the own vehicle information acquiring unit 12 performs an own vehicle information acquisition process (step S220). As a result, the speed, acceleration (deceleration), steering operation amount, and the like of the own vehicle are detected, and the travelling state of the own vehicle is identified. In addition, the driver information acquiring unit 14 performs a driver state detection process (step S225), and the driver state determining unit 15 performs a driver operation suitability level determination process (step S230).

After the processes at steps S205 to S230 are performed, when determined at step S235 that the driver is not in a state capable of performing driving operations (NO at step S235), the processes at steps S240 to S250 are performed. Meanwhile, when determined at step S235 that the driver is in a state capable of performing driving operations (YES at step S235), the processes at steps S240 to S250 are not performed.

When the processes at steps S240 to S250 are performed, in the evacuation travelling assistance apparatus 1, the risk determining unit 16 performs risk determination (step S240). At step S240, the risk determining unit 16 divides an area that may serve as the advancing destination of the own vehicle into a plurality of locations, and for each location, determines the risk involved in stopping at a location and the risk involved in passing through the location.

The risk determining unit 16 makes the determination by taking into overall consideration the map information (such as the road line shape) acquired by the map information acquiring unit 11, the own vehicle information (such as the vehicle speed) acquired by the own vehicle information acquiring unit 12, and the peripheral environment information (such as the presence/absence of a following vehicle) acquired by the peripheral environment information acquiring unit 13. The details of a specific determination method performed at step S240 will be described hereafter.

When the process at step S240 is performed, the risk determining unit 16 generates a map that includes the plurality of locations that may serve as the advancing destination of the own vehicle. A value indicating the risk level at the location is stored in the map in association with each location (the map is also referred to, hereafter, as a risk map). The risk determining unit 16 generates a plurality of such risk maps. The risks involved at each location are evaluated from a different perspective for each risk map, and a value indicating the risk level that is the evaluation result is stored in the risk map.

As examples of the risk map, for example, the various risk maps shown in FIGS. 6A to 6C, FIGS. 7A to 7C, and FIGS. 8A to 8C are generated at step S240. The maps shown as examples in FIGS. 6A to 6C each indicate three lanes in one direction on a six-lane road (referred to, hereafter, as the three lanes) and an emergency stopping lane (side strip) on the left side thereof. In addition, to facilitate understanding of the position of a curve in the drawing, in FIGS. 6A to 6C, the map is curved based on the road line shape. However, the data itself that is processed by the evacuation travelling assistance apparatus 1 does not have a data structure that takes into consideration the degree of curving.

A stop position risk map shown as an example in FIG. 6A indicates the risk level when the own vehicle stops at each location, taking into consideration the road shape. For example, among the three lanes and the emergency stopping lane, most of the locations in the three lanes have a risk level 2. Most of the locations in the emergency stopping lane on the left side of the three lanes have a risk level 0 (blank in the drawings). This indicates that the risk of rear-end collision and the like is higher when the own vehicle stops in the three lanes, compared to when the own vehicle stops in the emergency stopping lane.

In addition, on the curve, there is an area in the three lanes in which the risk level becomes 3, and an area in the emergency stopping lane in which the risk level becomes 1. This indicates that the risk of a rear-end collision and the like is higher when the own vehicle stops on the curve where visibility is poor, compared to when the own vehicle stops in a location where visibility is good. The risk level is given to each location as a result of the risk determining unit 16 performing risk analysis based on the map information acquired by the map information acquiring unit 11.

An entry risk map shown as an example in FIG. 6B maps the risk involved when the own vehicle that is travelling enters each location, taking into consideration the road shape. For example, when the advancing direction of the vehicle deviates outward on the outer side of the area where the curve starts, there is risk of contact with a guardrail or a protective barrier. Therefore, locations in this area are set to have a higher risk level than other locations. Such risk may also be mapped taking into consideration the speed of the own vehicle and the peripheral environment (such as the position in which another vehicle is present), in addition to the shape of the road.

A course-change route risk map shown as an example in FIG. 6C maps the risk involved when the own vehicle changes course at each location, taking into consideration the road shape. For example, in FIG. 6C, changing course on the curve is analyzed as involving high risk. As a result, locations such as those shown in FIG. 6C compose a high risk area.

Whereas the maps shown as examples in FIGS. 6A to 6C are all risk maps that have been generated taking into consideration the road shape, the risk maps shown as examples in FIGS. 7A to 7C are generated through analysis and mapping of the type of risk that is detected, based on the relationship with the movement distance of the own vehicle.

For example, a control-limit movement risk map shown as an example in FIG. 7A maps the risk level of when the own vehicle continues travelling under the control of the evacuation travelling assistance apparatus 1, and indicates that the risk involved becomes higher as the own vehicle continues to cruise over an excessively long distance.

A deceleration stop movement risk map shown as an example in FIG. 7B indicates whether or not deceleration and stopping can be safely performed. Locations at which more sudden braking (greater deceleration) is required to stop the own vehicle are analyzed as being locations involving a higher risk. In addition, in this example, the three lanes and the emergency stopping lane are assumed to exist. Because the vehicle speed is already reduced in the emergency stopping lane and the required deceleration is reduced by an equivalent amount, the area involving a high risk is smaller in the emergency stopping lane.

A course-change (left) movement risk map shown as an example in FIG. 7C maps the risk involved in moving to the left by a single traffic lane. Positions that involve a more sudden course change are analyzed as involving a higher risk. Because traffic lane change to the left is assumed in the map, the rightmost traffic lane is not subject to risk analysis.

A movement stop risk map shown as an example in FIG. 7D is a composite of the risk maps shown as examples in FIGS. 7A to 7C. In this example, traffic lane change is performed twice at locations where the risk level is the lowest based on the course change (left) movement risk map shown as an example in FIG. 7C. Thereafter, the deceleration and stop risk is added based on the deceleration stop movement risk map shown as an example in FIG. 7B. In addition, because the vehicle enters the emergency stopping lane after reducing its speed range, the deceleration stop movement risk is present for only a short distance.

Figure 8A:
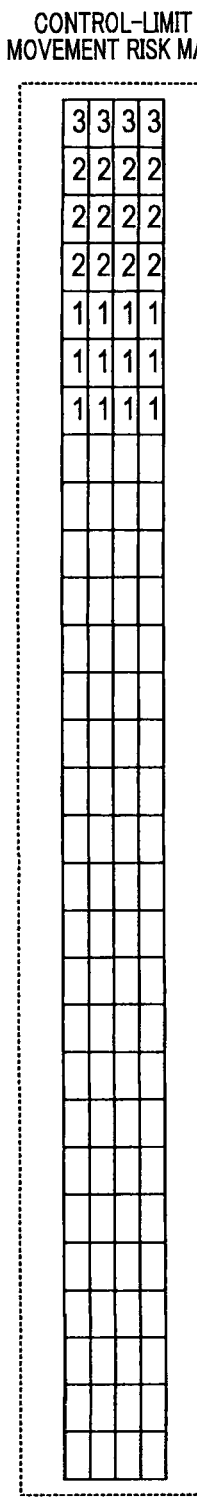
FIG. 8A is an explanatory diagram of an example of the control-limit movement risk map.
Figure 8B:
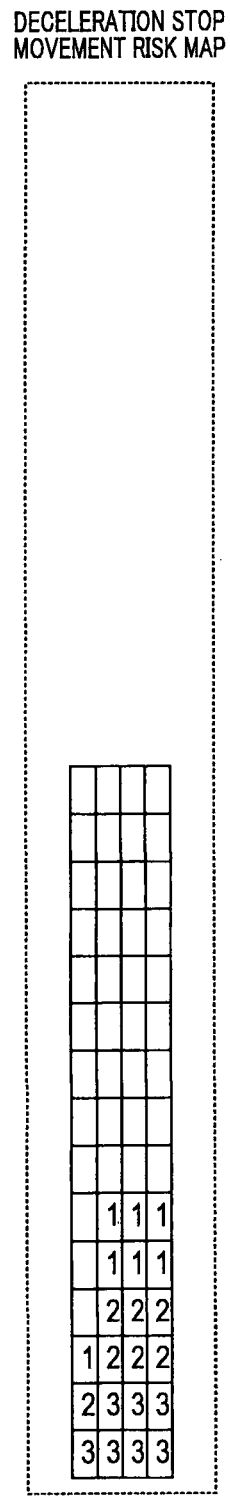
FIG. 8B is an explanatory diagram of an example of the deceleration stop movement risk map when the presence of a rear-side moving body can be confirmed.
Figure 8C:
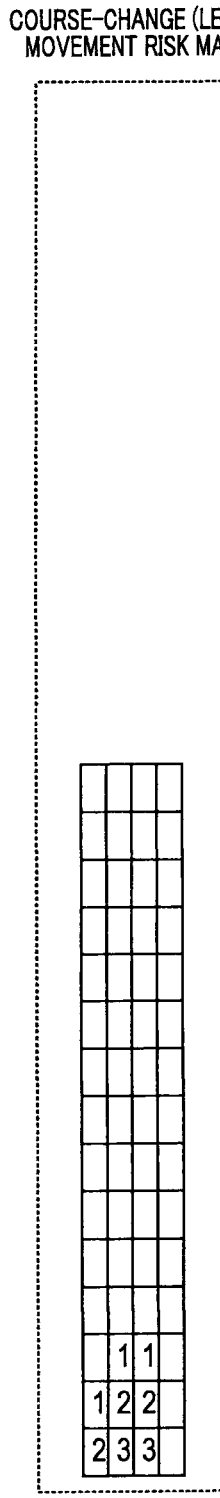
FIG. 8C is an explanatory diagram of an example of the course-change (left) movement risk map.

The risk maps shown as examples in FIGS. 8A to 8C have been generated based on principles similar to those in FIGS. 7A to 7C. FIGS. 7A and 8A are the same, as are FIGS. 7C and 8C. However, FIGS. 7B and 8B differ. Specifically, FIG. 8B is a risk map of when a following vehicle is confirmed not to be present. In this case, the risk of a rear-end collision with a following vehicle is low, even when more sudden braking (greater deceleration) is performed to stop the own vehicle. Therefore, as shown in FIG. 8B, the risk area is shorter than that in FIG. 7B, in the advancing direction.

Figure 8D:
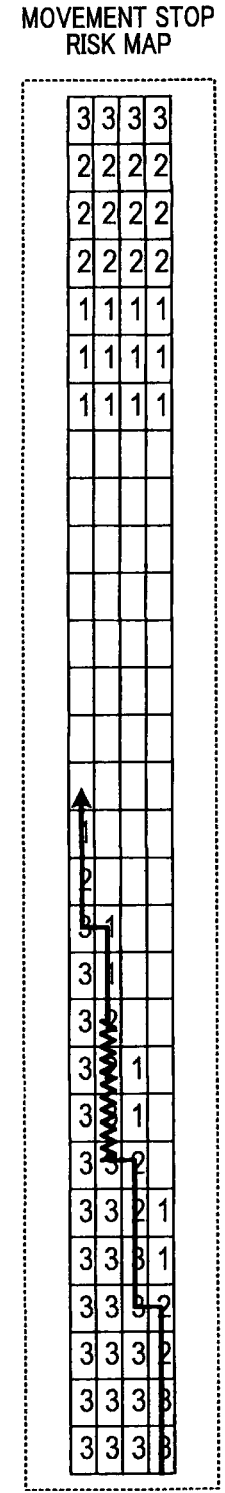
FIG. 8D is an explanatory diagram of an example of the movement stop risk map obtained by combining the maps in FIG. 8A to FIG. 8C.

The risk maps shown as examples in FIGS. 8A to 8C, when combined based on principles similar to those in FIG. 7D, form the movement stop risk map shown in FIG. 8D. In the movement stop risk map shown in FIG. 8D, the area involving a high risk is made smaller because vehicle speed can be reduced by a greater deceleration. The own vehicle is thereby able to stop at a low-risk location by travelling over a shorter distance.

Even when a following vehicle is present, when a rear-end collision with the following vehicle resulting from speed reduction by the own vehicle is expected not to occur based on the distance to the following vehicle and relative speed (such as when speed reduction by the following vehicle can be confirmed), a map that has intermediate values between those in the map shown in FIG. 7B and the map shown in FIG. 8B can also be used.

Figure 9A:
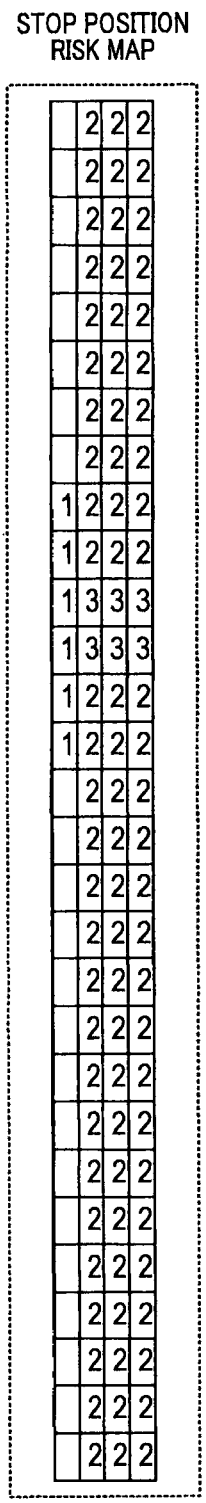
FIG. 9A is an explanatory diagram of an example of the stop position risk map.
Figure 9B:
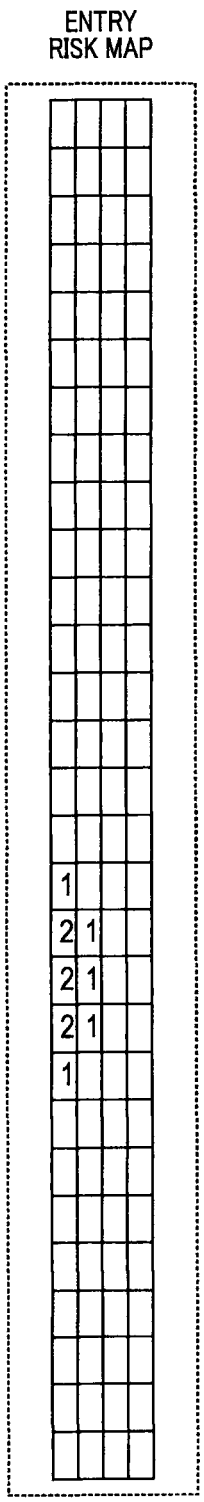
FIG. 9B is an explanatory diagram of an example of the entry risk map.
Figure 9C:
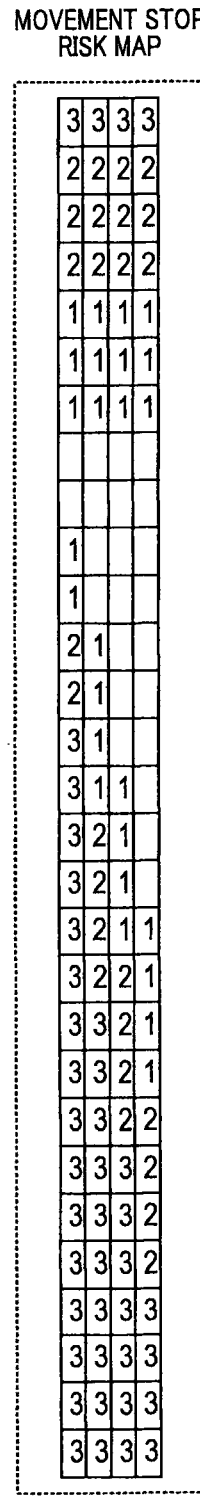
FIG. 9C is an explanatory diagram of an example of the movement stop risk map.

When the various risk maps such as those described above are generated at step S240, shown in FIG. 3, next, the evacuation destination setting unit 17 performs an evacuation destination setting process (step S245). Here, the map used to select the evacuation destination is, for example, a composite of a stop position risk map shown in FIG. 9A (a map similar to that in FIG. 6A), an entry risk map shown in FIG. 9B (a map similar to that in FIG. 6B), and a movement stop risk map shown in FIG. 9C (a map similar to that shown in FIG. 7D). In this case, the composite result is a map such as that shown in FIG. 9D.

Figure 9D:
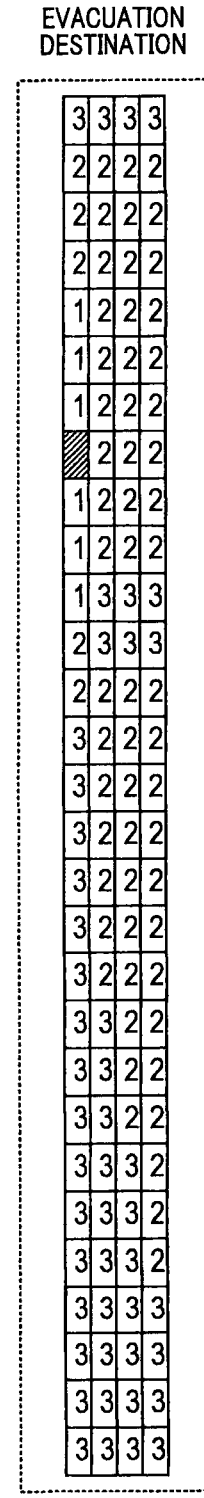
FIG. 9D is an explanatory diagram of an example of an evacuation destination setting risk map obtained by combining the maps in FIG. 9A to FIG. 9C.

At step S245, the evacuation destination setting unit 17 retrieves locations that have a low risk level from the locations included in the map shown in FIG. 9D. As the locations that have a low risk level, the evacuation destination setting unit 17 may retrieve locations that have a risk level 0. Alternatively, the evacuation destination setting unit 17 may retrieve each location that has a risk level of 0, 1, or 2, and when a location that has a lower risk level cannot be used, a single location that has a higher risk level may be selected. Specifically, the process at S245 is such as that shown in FIG. 4.

First, the evacuation destination setting unit 17 repeatedly performs the processes at steps S320 to S350 on each location included in the map used to select the evacuation destination (see FIG. 9D) as long as a low-risk area to be processed is present (YES at step S310). In the processes that are repeatedly performed, the evacuation destination setting unit 17 compares the risk levels of the locations serving as comparison targets (step S320), compares the movement distances to the locations serving as comparison targets (step S330), registers, in a database, a location that is suitable for the evacuation destination as a destination area (step S340), and removes the registered area from the risk comparison target (step S350).

As a result, the evacuation destination setting unit 17 selects locations that are suitable for the evacuation destination from the map used to select the evacuation destination, and registers the locations in the database. Then, when determined that a low-risk area to be processed is no longer present (NO at step S310), the evacuation destination setting unit 17 ends the process shown in FIG. 4, thereby completing step S245 in FIG. 3.

Next, the evacuation route setting unit 18 performs an evacuation route setting process (S250). Here, as a map used to select the evacuation route, for example, the entry risk map shown in FIG. 10A (a map similar to that in FIG. 6B), the course-change (left) movement risk map shown in FIG. 10B (a map similar to that in FIG. 7C), and the deceleration stop movement risk map shown in FIG. 10C (a map similar to that in FIG. 7B) are combined, and an evacuation route generation risk map such as that shown in FIG. 10D is generated.

In FIG. 10D, based on the course-change (left) movement risk map shown in FIG. 10B, a course change is made to the traffic lane that is one traffic lane to the left at the low-risk location. However, when the traffic lane change to the left is simply repeated, entry into the area indicated by the slanted lines in FIG. 10D is allowed, and as a result, an area that has the risk level 1 in the entry risk map shown in FIG. 10A appears in the advancing direction. Therefore, a course change to the right is required to avoid this area, thereby causing the own vehicle to carry out unnecessary behavior.

Here, regarding the location that is sandwiched from the front and behind by high-risk areas (the area indicated by the slanted lines in FIG. 10D), the evacuation route setting unit 18 considers this location to be an area that involves risk equivalent to that of the areas in front and behind, and sets the evacuation route. In other words, in the example shown in FIG. 10D, the evacuation route setting unit 18 considers the risk level of the area indicated by the slanted lines to be 1 and makes corrections such as to obtain the evacuation route generation risk map such as that shown in FIG. 11A.

At step S250, the evacuation route setting unit 18 uses the map for selecting the evacuation destination such as that shown in FIG. 11B (a map similar to that in FIG. 9D), the deceleration and stop movement risk map shown in FIG. 11C (a map similar to that in FIG. 7B), the course-change (left) movement risk map shown in FIG. 11D (a map similar to that in FIG. 7C), and the course-change route risk map shown as an example in FIG. 11E (a map similar to that in FIG. 6C), in addition to the evacuation route generation risk map shown in FIG. 11A, and selects the evacuation route. Specifically, the process at step S250 is such as that shown in FIG. 5.

First, the evacuation route setting unit 18 repeatedly performs the processes at steps S420 to S460 as long as an area that is a candidate for the evacuation destination is present (YES at step S410). In the processes that are repeatedly performed, first, the evacuation route setting unit 18 selects the lowest-risk movement route for moving to the evacuation destination (step S420). Here, at step S420, the evacuation route setting unit 18 performs route setting by selecting locations that have low risk levels, as according to the basic principles, with focus simply on minimizing the risk level. However, as described in detail hereafter, the own vehicle may not be able to appropriately reach the evacuation destination through simple selection of locations that have low risk levels as according to the basic principles.

Therefore, the evacuation route setting unit 18 determines whether or not the own vehicle can reach the destination by the movement route selected at step S240 (step S430). When determined that the own vehicle can reach the destination (YES at step S430), because a suitable route that enables the own vehicle to reach the target evacuation destination has been found, the evacuation route setting unit 18 returns to step S410 and proceeds to examine the next evacuation destination candidate.

Meanwhile, when determined at step S430 that the own vehicle cannot reach the destination (NO at step S430), the evacuation route setting unit 18 excludes the route as an unreachable route (step S440) and selects a runner-up risk movement route that involves the second lowest risk (step S450). The runner-up risk movement route will also be described in detail hereafter.

Next, the evacuation route setting unit 18 determines whether or not the runner-up risk movement route involves the highest risk (step S460). Here, a situation in which the runner-up risk movement route involves the highest risk refers to a situation in which the own vehicle has no choice other than to pass through a location that has a risk level 3 when the runner-up risk movement route is used.

Therefore, when determined that the runner-up risk movement route involves the highest risk (YES at step S460), because a suitable route that enables the own vehicle to reach the target evacuation destination has not been found, the evacuation route setting unit 18 returns to step S410 and proceeds to examine the next evacuation destination candidate.

Meanwhile, when determined at step S460 that the runner-up risk movement route does not involve the highest risk (NO at step S460), the evacuation route setting unit 18 returns to step S430. As a result, the evacuation route setting unit 18 determines whether or not the own vehicle can reach the evacuation destination by the movement route selected at step S450 (step S430).

When determined that the own vehicle can reach the destination (YES at step S430), because a runner-up route that enables the own vehicle to reach the target evacuation destination has been found, the evacuation route setting unit 18 returns to step S410 and proceeds to examine the next evacuation destination candidate.

When determined at step S430 that the own vehicle cannot reach the destination (NO at step S430), because the own vehicle cannot reach the target evacuation destination even by the movement route selected at step S450, the evacuation route setting unit 18 proceeds again to the process at step S440 and subsequent steps, and retrieves another runner-up route. The process for retrieving a runner-up route such as this is repeatedly performed until the runner-up risk movement route becomes that involving the highest risk, as described above.

When processing of all evacuation destination candidates through processes such as those described above is completed (NO at step S410), the result for each evacuation target candidate is any of the following: the lowest-risk movement route has been found, the first or subsequent runner-up movement route has been found, or no movement route has been found. The evacuation route setting unit 18 then selects the destination and route involving the lowest risk, from these combinations of evacuation destinations and evacuation routes (S470), and ends the process shown in FIG. 5, thereby completing step S250 in FIG. 3.

Figure 12A:
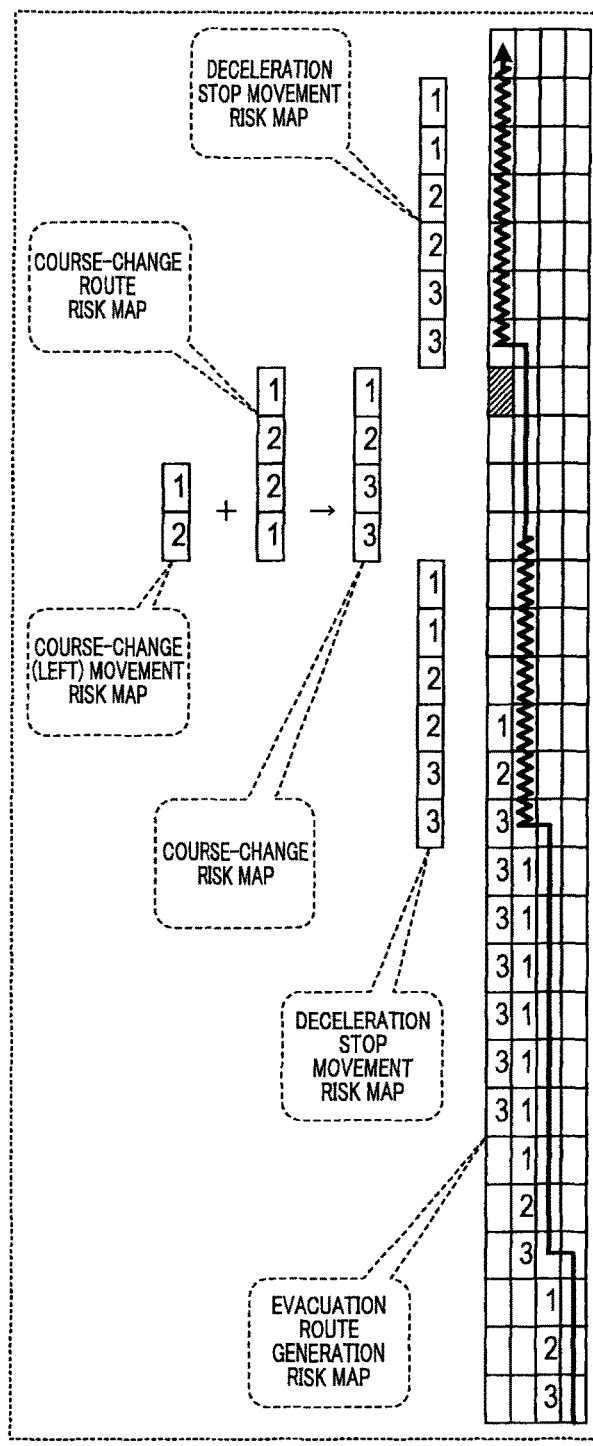
FIG. 12A is an explanatory diagram of an example of an evacuation route by which an evacuation destination cannot be reached.
Figure 12B:
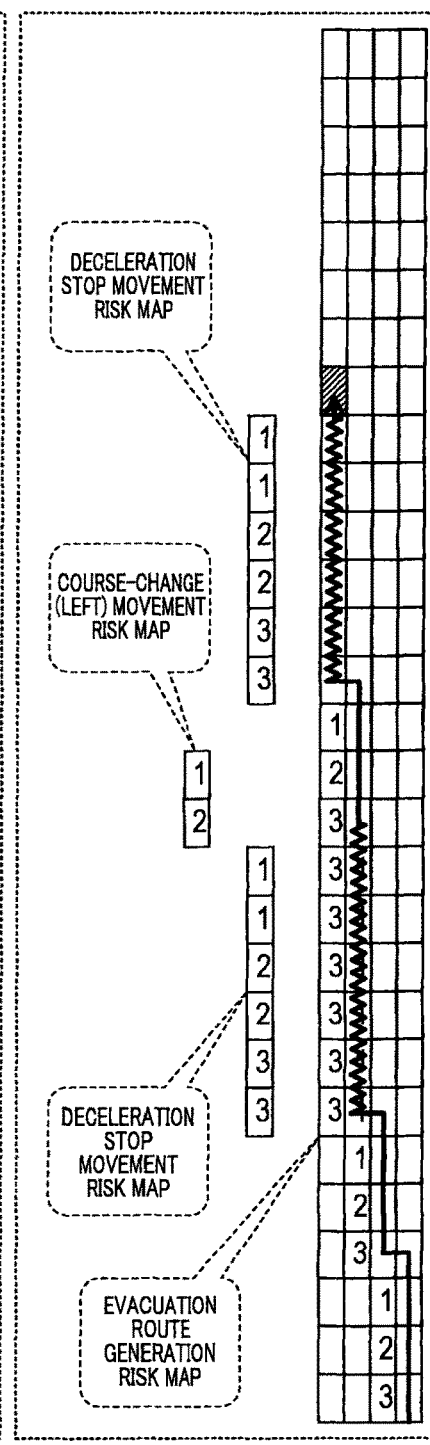
FIG. 12B is an explanatory diagram of an example of an evacuation route by which the evacuation destination can be reached.

Here, as mentioned above, an example in which the own vehicle cannot appropriately reach the evacuation destination through simple selection of locations that have low risk levels as according to the basic principles, and an example in which a runner-up risk movement route is selected are described with reference to FIGS. 12A and 12B. In FIGS. 12A and 12B, the area indicated by the slanted lines is an evacuation destination, and the bending line drawn over the risk map indicates the travelling trajectory of the own vehicle.

FIG. 12A shows an example in which locations that have low risk levels are selected as according to the basic principles, and an attempt is made to reach the evacuation destination. Specifically, the vehicle which is in the rightmost traffic lane first attempts to change course to the traffic lane on the left side, in order to approach the emergency stopping lane.

In this case, based on the evacuation route generation risk map, first, the vehicle changes course to the traffic lane on the left side when the location in the traffic lane on the left side that has the risk level 0 is reached. Then, the vehicle changes course to the traffic lane on the left side when the next location in the traffic lane on the left side that has the risk level 0 is reached, and at this point, starts deceleration. At this time, the vehicle avoids excessive sudden braking and decelerates until the risk level becomes 0, based on the deceleration stop movement risk map (see the area indicated by the wavy lines in FIG. 12A).

However, at this point, a course-change risk map that is a composite of the course-change (left) movement risk map and the course-change route risk map indicates that there is risk involved in changing traffic lanes to the left side.

Therefore, the vehicle changes traffic lanes to the left side after advancing to the location at which the risk level becomes 0 in the course-change risk map, and thereafter, avoids excessive sudden braking and decelerates until the risk level becomes 0, based on the deceleration stop movement risk map (see area indicated by wavy lines in FIG. 12A). As a result, the vehicle reaches a position that is beyond the evacuation destination. This is an example in which the evacuation destination cannot be reached by the lowest-risk movement route.

When the vehicle cannot reach the evacuation destination by the lowest-risk movement route in this way, as shown in FIG. 12B, the runner-up risk movement route is selected. Specifically, the vehicle which is in the rightmost traffic lane first attempts to change course to the traffic lane on the left side, in order to approach the emergency stopping lane.

In this case, based on the evacuation route generation risk map, first, the vehicle changes course to the traffic lane on the left side when the location in the traffic lane on the left side that has the risk level 0 is reached. Then, because the next location in the traffic lane on the left side that has the risk level 0 is quite far, in this case, the vehicle is permitted entry into a location that has a risk level 1. However, in this case as well, a situation in which other risks arise is avoided by taking into consideration the other risk maps. Therefore, for example, the vehicle changes course to the left side at a location that has the risk level 0 in the course-change (left) movement risk map.

Thereafter, the vehicle avoids excessive sudden braking and decelerates until the risk level becomes 0, based on the deceleration stop movement risk map (see the area indicated by the wavy lines in FIG. 12B). Then, based on the evacuation route generation risk map and the course-change (left) movement risk map, the vehicle subsequently changes traffic lanes to the left side when both risks are no longer present, and thereafter, avoids excessive sudden braking and decelerates until the risk level becomes 0, based on the deceleration stop movement risk map (see area indicated by wavy lines in FIG. 12B).

As a result, in the example shown in FIG. 12B, the vehicle reaches the evacuation destination exactly. This is an example in which the evacuation destination can be reached by the runner-up risk movement route.

In other words, as a result of the vehicle being permitted entry into a location that has the risk level 1 just once, the vehicle can reach the evacuation destination even when subsequently moved as according to the basic principles. Therefore, when the vehicle cannot reach the evacuation destination by being moved as according to the basic principles, a movement route to the desired evacuation destination can be secured while minimizing increase in risk, rather than arrival at the evacuation destination simply being abandoned.

When the processes at step S235 to S250, shown in FIG. 3, are completed as described above, the evacuation travelling assistance apparatus 1 performs driver take-over command value calculation (step S255) and driver operation suppression request calculation (step S260), depending on the circumstances. The evacuation travelling assistance apparatus 1 then issues commands to each system configuring the travelling assistance system 2, based on the calculation results.

As a result, the travelling assistance system 2 performs vehicle control by the above-described processes at steps S120 to S150. The command generated at step S255 is primarily used to enable vehicle control to be performed on behalf of the driver. For example, accelerator operation, brake operation, steering operation, and the like can be controlled based on the calculation results at step S255, even should the driver not perform these operations.

In addition, the driver operation suppression request generated at step S260 is primarily used to enable unexpected operations by the driver to be suppressed. For example, even should an unexpected steering operation be performed at the driver's seat during control being performed to changed traffic lanes to an emergency stopping lane, input associated with such an operation is suppressed. Alternatively, the driver can be prevented from collapsing onto the operating controls by a seatbelt pretensioner being operated, thereby suppressing unexpected erroneous input into the system.

Effects

As described above, in the above-described evacuation travelling assistance apparatus 1, the risk determining unit 16 performs risk determination such as that described above, and the evacuation destination and the evacuation route are set. Therefore, compared to techniques in which the evacuation destination is determined without risk determination such as that described above being performed (such as a technique in which course change to the road shoulder is immediately made or a technique in which the vehicle is immediately stopped), the evacuation travelling assistance apparatus 1 can evacuate the vehicle to an evacuation destination that has a higher level of safety.

In addition, regarding the evacuation route used to move the vehicle to such an evacuation destination, compared to techniques in which vehicle speed and advancing direction are controlled without risk determination such as that described above being performed, the evacuation travelling assistance apparatus 1 can use an evacuation route that has a higher level of safety.

In addition, in the above-described evacuation travelling assistance apparatus 1, for each of the plurality of locations that may serve as the advancing destination of the own vehicle, the risk determining unit 16 performs evaluation based on a plurality of levels for each of several risks among the following plurality of risks: risk based on the road shape when the location is set as the stopping position; risk based on the road shape when the own vehicle enters the location; risk based on the road shape when a course change is made at the location; the risk involved in continuing travelling to the location under the travelling assistance system 2; the risk involved in decelerating towards the location or stopping at a location; and the risk involved in changing course towards the location.

The risk determining unit 16 determines the risk involved in stopping at each location and the risk involved in passing through each location based on the evaluation results. Therefore, compared to techniques in which the evacuation destination and the evacuation route are set without comprehensively determining these risks, the evacuation travelling assistance apparatus 1 can set an evacuation destination and an evacuation route that have a higher level of safety.

In addition, in the above-described evacuation travelling assistance apparatus 1, when an evacuation route (in other words, the above-described lowest-risk movement route) to the evacuation destination cannot be set by combining locations at which the risk involved in passing through the location is the lowest, the evacuation route setting unit 18 sets the evacuation route (in other words, the above-described runner-up risk movement route) to the evacuation destination by combining one or more locations at which the risk involved in passing through the location is higher by a single level than the location at which the risk involved is the lowest.

Therefore, when the evacuation destination cannot be reached, a movement route to the desired evacuation destination can be secured while minimizing increase in risk, rather than arrival at the evacuation destination simply being abandoned.

Other Embodiments

The evacuation travelling assistance apparatus according to an exemplary embodiment is described above. However, the present invention is not limited to the above-described exemplary embodiment, and various embodiments are possible without departing from the technical concept of the present invention.

For example, according to the above-described embodiment, a description is given that the vehicle includes, as the travelling assistance system 2, the full-speed-range cruise control and inter-vehicle distance control apparatus 21, the traffic lane keep assistance control apparatus 22, the traffic lane change assistance control apparatus 23, and the like. However, other similar systems may be mounted in the vehicle as long as equivalent vehicle movement control can be performed.

In addition, although no particular mention is made in the above-described embodiment, for example, should risk be determined based on the road shape or the like in the above-described risk maps, such risk information may be provided as part of the map information in advance. In addition, a configuration is possible in which information on conditions that can dynamically change, such as the presence of traffic jams and traffic accidents, is provided as a risk map via communication from an outside facility, when such conditions occur.

In addition, a configuration is also possible in which, when evacuation travelling assistance such as that described above is started, the hazard lights or the brake lights are flashed, or the horn is sounded, to notify targets in the periphery (other vehicles and persons) that the vehicle is in a state requiring evacuation travelling assistance. When peripheral vehicles move away from the periphery of the own vehicle by a predetermined distance or more as a result, the inter-vehicle distance can be detected, the risk maps can be regenerated, and a safer evacuation route can be secured.

In addition, according to the above-described embodiment, the risk level is expressed by four levels, from 0 to 3. However, the risk level may be expressed by three levels or less, or five levels or more. In addition, although no particular mention is made in the above-described embodiment, the risk levels may be simply added or an average value may be determined, when the risk maps are combined.

Alternatively, a weight may be changed for each risk map by a predetermined coefficient being multiplied for each risk map, before the risk levels are added. Moreover, when the risk levels are added, an addition result that exceeds a predetermined upper limit may be considered to be the upper limit value. For example, when the risk level is expressed by four levels, from 0 to 3, as according to the above-described embodiment, all locations of which the addition result is 3 or more may be considered to have a risk level 3.

Furthermore, according to the above-described embodiment, the overall system is configured so that certain apparatuses take on certain functions. However, the functions taken on by some apparatuses may be taken on by other apparatuses. In addition, functions taken on by two or more apparatuses may be integrated in a single apparatus, or a function actualized by a single apparatus may be actualized through cooperation between two or more apparatuses.

In addition, at least a part of the configuration according to the above-described embodiment may be replaced with a publically known configuration that provides similar functions. In addition, a part of the configuration according to the above-described embodiment may be omitted to an extent enabling the problem to be solved.

Moreover, the present invention can also be actualized by various modes in addition to the above-described evacuation travelling assistance apparatus, such as a system of which a constituent element is the evacuation travelling assistance apparatus, a program enabling a computer to function as the evacuation travelling assistance apparatus in part or in its entirety, a medium on which the program is recorded, and an evacuation travelling assistance method.

What is claimed is:

1. An evacuation travelling assistance apparatus comprising:
   a map information acquiring unit configured to acquire map information related to an area that may serve as an advancing destination of an own vehicle;
   an own vehicle information acquiring unit configured to acquire own vehicle information related to a state of the own vehicle;
   a peripheral environment information acquiring unit configured to acquire peripheral environment information related to targets present in a periphery of the own vehicle;
   a driver information acquiring unit configured to acquire driver information that enables determination of whether or not a driver is in a state capable of appropriately performing driving operations;
   a driver state determining unit that, using a processor, determines whether or not the driver is in a state capable of appropriately performing driving operations, based on the driver information acquired by the driver information acquiring unit;
   a risk determining unit that, using the processor, determines, when determined by the driver state determining unit that the driver is not in a state capable of appropriately performing driving operations, 1) a risk involved in stopping at each location used for setting an evacuation destination that is a location to which the own vehicle is evacuated and 2) a risk involved in passing through each location used for setting an evacuation route that is a route from a current position of the own vehicle to the evacuation destination, for each of a plurality of locations that may serve as an advancing destination of the own vehicle, included in the map information acquired by the map information acquiring unit, based on the map information, the own vehicle information, and the peripheral environment information;
   an evacuation destination setting unit that, using the processor, sets a location at which the risk involved in stopping at each location is lower than a predetermined reference as an evacuation destination, based on the risk of each location determined by the risk determining unit;
   an evacuation route setting unit that, using the processor, combines locations at which the risk involved in passing through each location is lower than a predetermined reference, based on the risk of each location determined by the risk determining unit, and sets an evacuation route from the current position of the own vehicle to the evacuation destination; and
   an evacuation travelling control unit that, using the processor, generates data that is to be provided to a travelling assistance system included in the own vehicle, based on the set evacuation destination and evacuation route, and provides the generated data to the travelling assistance system, thereby making the own vehicle advance to the evacuation destination along the evacuation route.

2. The evacuation travelling assistance apparatus according to claim 1, wherein the risk determining unit is configured to:
   perform evaluation for each of the plurality of locations that may serve as the advancing destination of the own vehicle, based on a plurality of levels for each of one or more risks among a plurality of risks including:
      i) a risk based on a road shape when the location is set as a stopping position;
      ii) a risk based on a road shape when the own vehicle enters the location;
      iii) a risk based on a road shape when a course change is made at the location;
      iv) a risk involved in continuing travelling to the location under the travelling assistance system;
      v) a risk involved in decelerating towards the location or stopping at the location; and
      vi) a risk involved in changing course towards the location; and
   determine the risk involved in stopping at each location and the risk involved in passing through each location based on evaluation results.

3. The evacuation travelling assistance apparatus according to claim 2, wherein
   the evacuation route setting unit is configured to set, when an evacuation route to the evacuation destination cannot be set by combining locations at which the risk involved in passing through the location is a lowest, an evacuation route to the evacuation destination by combining one or more locations at which the risk involved in passing through the location is higher by a single level than the location at which the risk involved is the lowest.

4. The evacuation travelling assistance apparatus according to claim 3, wherein
   the travelling assistance system is configured to be capable of performing at least one control of a full-speed-range constant speed travelling and inter-vehicle distance control, a traffic lane keep assistance control, and a traffic lane change assistance control.

5. The evacuation travelling assistance apparatus according to claim 2, wherein
   the travelling assistance system is configured to be capable of performing at least one control of a full-speed-range constant speed travelling and inter-vehicle distance control, a traffic lane keep assistance control, and a traffic lane change assistance control.

6. The evacuation travelling assistance apparatus according to claim 1, wherein
   the travelling assistance system is configured to be capable of performing at least one control of a full-speed-range constant speed travelling and inter-vehicle distance control, a traffic lane keep assistance control, and a traffic lane change assistance control.

7. An evacuation travelling assistance method comprising:
   acquiring, by an evacuation travelling assistance apparatus mounted to an own vehicle, map information related to an area that may serve as an advancing destination of the own vehicle;
   acquiring, by the evacuation travelling assistance apparatus, own vehicle information related to a state of the own vehicle;

acquiring, by the evacuation travelling assistance apparatus, peripheral environment information related to targets present in a periphery of the own vehicle;

acquiring, by the evacuation travelling assistance apparatus, driver information that enables determination of whether or not a driver is in a state capable of appropriately performing driving operations;

determining, by the evacuation travelling assistance apparatus, whether or not the driver is in a state capable of appropriately performing driving operations, based on the driver information;

determining, by the evacuation travelling assistance apparatus, when determined that the driver is not in a state capable of appropriately performing driving operations, 1) a risk involved in stopping at each location used for setting an evacuation destination that is a location to which the own vehicle is evacuated and 2) a risk involved in passing through each location set to the location used for setting an evacuation route that is a route from a current position of the own vehicle to the evacuation destination, for each of a plurality of locations that may serve as an advancing destination of the own vehicle, included in the map information, based on the map information, the own vehicle information, and the peripheral environment information;

setting, by the evacuation travelling assistance apparatus, a location at which the risk involved in stopping at each location is lower than a predetermined reference as an evacuation destination, based on the risk of each location;

combining, by the evacuation travelling assistance apparatus, locations at which the risk involved in passing through each location is lower than a predetermined reference, based on the risk of each location, and setting an evacuation route from the current position of the own vehicle to the evacuation destination; and generating, by the evacuation travelling assistance apparatus, data that is to be provided to a travelling assistance system included in the own vehicle, based on the set evacuation destination and evacuation route, and providing the generated data to the travelling assistance system, thereby making the own vehicle advance to the evacuation destination along the evacuation route.

* * * * *